Jan. 14, 1930.   R. E. LYFORD   1,743,149
SEATING ARRANGEMENT FOR MOTOR VEHICLES
Filed Nov. 25, 1925
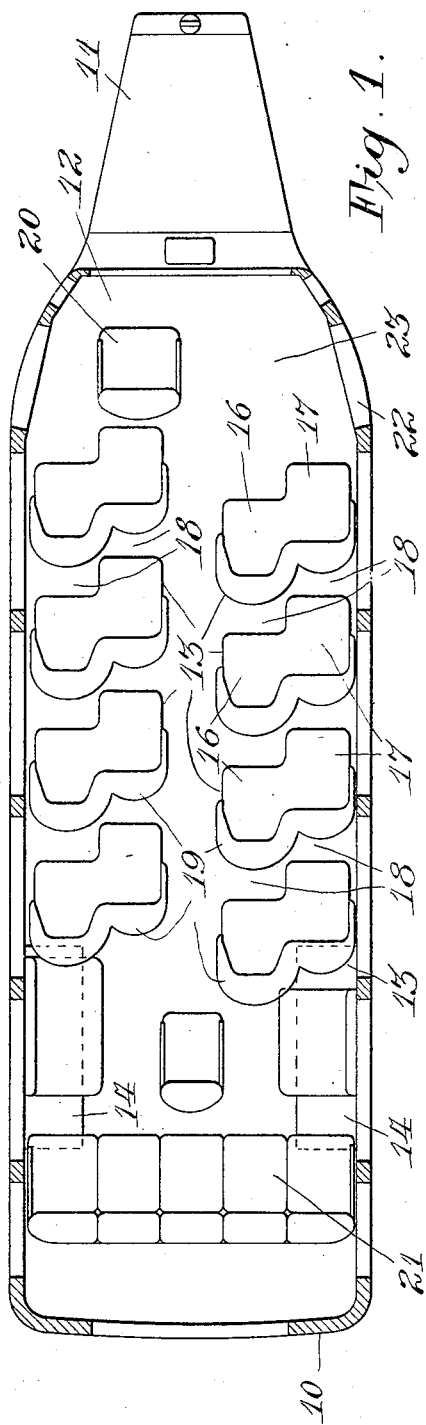
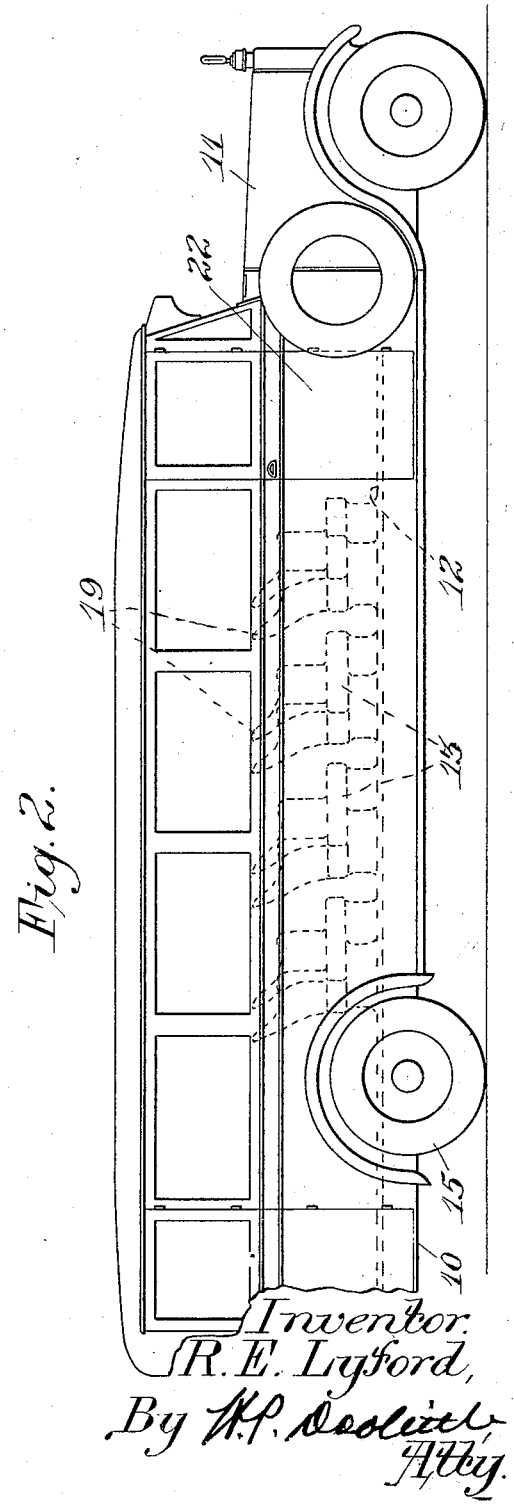
Inventor.
R. E. Lyford,
By
Atty.

Patented Jan. 14, 1930

1,743,149

UNITED STATES PATENT OFFICE

ROBERT E. LYFORD, OF CHICAGO, ILLINOIS, ASSIGNOR TO INVENTION ENGINEERING CORPORATION, A CORPORATION OF ILLINOIS

SEATING ARRANGEMENT FOR MOTOR VEHICLES

Application filed November 25, 1925. Serial No. 71,311.

This invention relates to motor vehicles such as busses, coaches and street cars, and particularly to a seating arrangement therefor.

In some jurisdictions legal requirements limit the lateral width or dimension of vehicles such as motor coaches and busses, and accordingly a problem arises in connection with the arrangement of seats in these vehicles in such jurisdictions, for when the deck of the vehicle is narrowed, obviously the passenger capacity is likewise limited, as less room remains for the arrangement of seats. As is well known in this art, the conventional transverse seating arrangement in a coach or bus usually comprises longitudinally arranged rows of seat units space one behind the other along each side of the deck of such vehicles, and furthermore each unit in one row is made up of two seats arranged in lateral alinement and each such seat unit is disposed in exact lateral alinement with a similar seat unit comprising two seats in the oppositely disposed row of seat units. When such conventional vehicles are confronted with the legal requirements of certain jurisdictions, as mentioned, the comfort of the passengers is immediately affected because of the necessity of crowding the seats, and the only other alternative in such conventional arrangements would be to remove certain seats, and this is objectionable because it lessens the seating and also the earning capacity of such a vehicle.

With all of this in mind, it is the main object of the invention to provide a novel form of seating arrangement for vehicles of the kind specified, whereby the comfort of the passengers will not be affected, nor will the seating capacity be lessened in vehicles to be used in such localities where narrow decks must be used due to the legal requirements of the particular jurisdiction.

Another object is to provide a roomy entrance vestibule for a motor coach.

These objects are briefly accomplished by providing along each side of the bus deck a longitudinal row of spaced seat units with an aisle between each row; each seat unit in each row comprising two seat portions which are relatively offset, and furthermore each seat unit in one row being laterally offset with respect to each seat unit in the oppositely disposed row, which oppositely disposed row comprises seat units of similar construction.

In the accompanying sheet of drawings an illustrative embodiment of this invention is illustrated and therein it will be noted that like characters of reference designate similar parts throughout the several views, and in these drawings:

Fig. 1 is a plan view of the deck of a bus or coach showing the novel seating arrangement of this invention; and Fig. 2 is a side elevation of the bus shown in Fig. 1.

The bus or coach illustrated in the drawings will be of standard construction except that it will have a narrow deck for the purpose stated and, as shown, it comprises the usual body 10, hood 11, and deck 12, generally rectangular in shape. The deck 12 is provided with a longitudinal row of seat units along each side wall thereof as shown, the units being indicated generally at 13 and each unit being spaced longitudinally one from the other from substantially the front end of the coach deck to that point on the deck where the same is arched as at 14, to provide a space for the rear carrying wheels 15.

Each seat unit 13 is made up of two seat portions 16 and 17, as shown, which portions are relatively offset, the portion 16 of one unit extending rearwardly into the space which is provided on the deck by setting the seat portion 16 of the adjacent rearwardly disposed unit 13 rearwardly in a similar manner, so that each seat unit is complementarily disposed with respect to all of the other units in each particular row whereby the offset entrance passage-ways 18 are provided. Each seat unit is provided with a back rest 19, and it should be noted that the back rests for each seat are also relatively offset in the same manner as the seat portions. It will be observed that the rearmost unit 13, due to its offset seat arrangement, utilizes available deck space, by neatly fitting over the arch portion 14 on the deck.

The row of seats on the opposite side of the deck is made up of the same kind of seat units and here too it will be observed that the rearmost seat unit also neatly fits against the arch 14 on that side of the deck. It is further to be observed that, in addition to disposing each seat portion in each unit in offset relationship, each unit in one row is laterally offset with respect to each unit in the opposite row and that a suitable aisle is provided between the rows, which communicates with the offset entrance passage-ways 18 for each seat unit. At the front end of the deck to one side of the longitudinal median line, there is provided any suitable seat 20 for the operator of the vehicle, and rearwardly of the arches 14 the deck space may be utilized by providing a row of seats 21.

A door 22 is provided as usual, and the offset disposition of one row of seats with respect to the other row is such as to bring that row along the door side to the rear to provide a roomy entrance vestibule 23 for passengers entering the vehicle, and this is of material advantage in so far as the passengers' comfort is concerned when they stop at the driver's seat 20 to pay fares upon entering.

In the seat arrangement disclosed, the passengers' comfort is markedly enhanced and in the present art, this is a prime consideration. By seating the passengers as herein proposed, no two people have to sit side by side and rub shoulders. One of the most frequent complaints presented in the transportation business, both by operators and passengers, is due to the fact that not enough individuality is afforded by present day seating arrangements. With applicant's staggered seats, the passengers are close enough for convenient conversation, yet they are not exactly occupying the same seat. Each passenger has his own individual seat and back. This affords more elbow room and a greater opportunity to slouch or occupy the seat as each individual may want to do.

The present proposed seating arrangement would not necessarily be limited to narrow deck coaches, for, when used in standard width coaches, such arrangement would result in even more aisle room and a greater measure of comfort than would otherwise be obtainable.

It is also to be noted that the seat units on one side are all identical with the units on the other side, and that they all face forwardly.

From the above description and disclosure it will be appreciated that there is herein provided a bus or coach, whose deck, while of a narrow width, nevertheless may comfortably carry a maximum number of passengers, due to the novel seating arrangement herein disclosed.

It should be appreciated that there has herein been disclosed only an illustrative form of the invention and that anyone familiar with this art may vary the exact arrangement shown and still be within the spirit of this invention as embodied in the subjoined claims.

What I claim is:

1. A vehicle having a seating arrangement including a double seat element having transversely disposed seats relatively offset longitudinally of the vehicle, a pair of similar double seat elements separated from the first element by an aisle, the outside seat of said first element being opposite the outside seat of one of the elements of said pair, and the center of the inside seat of said first element being substantially on a transverse line with the center of the space between the inside seats of said pair of elements.

2. A vehicle having a longitudinal row of seat units arranged along each side of the deck with an aisle between the rows, each unit having two seats transversely disposed and longitudinally offset relatively, each outside seat in each unit in one row being opposite an outside seat in a unit in the other row, the inside seats in said respective units being staggered relatively with the center of each inside seat opposite the center of a space between the inside seats of two seat units on the opposite side of the aisle.

3. A vehicle having two rows of seating elements extending longitudinally of the vehicle and separated by an aisle, each element having forwardly facing seating areas disposed in fixed and constant relative position transversely of the vehicle and offset relatively longitudinally of the vehicle with the front edge of one seating area on a transverse line with the center of the other seating area, said elements being arranged in pairs transversely of the vehicle with the outside seating areas of the elements in each pair directly opposite one another and with the inside seating areas of the elements on one side of the aisle projected forward of the outside seating areas and the inside seating areas in the opposite elements being projected to the rear whereby a staggered aisle clearance of maximum distance between seating areas on opposite sides of the aisle is provided.

4. A vehicle having a passage opening in one side at the front end thereof, a pair of double seat units near said front end and separated by an aisle, each unit having transversely disposed longitudinally offset seats, the outside seats of the pair being opposite one another, the inside seat of the unit on the side opposite the passage opening being in advance of the outside seat of the unit on the opening side, and the inside seat of said unit on the opening side being located to the rear of the outside seat of the unit on the other side, and similar seat units correspondingly arranged with respect to their seats behind the first units in longitudinal rows.

5. A vehicle having a seating arrangement including two pairs of seat elements separated by an aisle, each element having two seats having fixed and constant position relative to one another and to the vehicle and disposed transversely and relatively offset longitudinally, the outside seats of the elements of the pair on one side being respectively opposite the outside seats of the elements of the pair across the aisle, and the inside seats of opposed elements being relatively staggered with the center of an inside seat of one element on one side of the aisle being in advance of the centers of both inside and outside seats of an element on the opposite side and the inside seat of the succeeding element on the first side of the aisle being to the rear of the centers of the seats of the said opposite element.

In testimony whereof I affix my signature.

ROBERT E. LYFORD.